(12) United States Patent
Shirota

(10) Patent No.: US 8,000,560 B2
(45) Date of Patent: Aug. 16, 2011

(54) VIRTUAL SLIDE GENERATION DEVICE, VIRTUAL SLIDE GENERATION METHOD, VIRTUAL SLIDE GENERATION PROGRAM PRODUCT AND VIRTUAL SLIDE GENERATION PROGRAM TRANSMISSION MEDIUM

(75) Inventor: Tetsuya Shirota, Tokyo (JP)

(73) Assignee: Olympus Corporation, Tokyo (JP)

( * ) Notice: Subject to any disclaimer, the term of this patent is extended or adjusted under 35 U.S.C. 154(b) by 874 days.

(21) Appl. No.: 12/011,355

(22) Filed: Jan. 25, 2008

(65) Prior Publication Data
US 2008/0187208 A1 Aug. 7, 2008

(30) Foreign Application Priority Data

Feb. 5, 2007 (JP) ................. 2007-026088

(51) Int. Cl.
*G06K 9/36* (2006.01)
*G06K 9/00* (2006.01)

(52) U.S. Cl. .................. 382/284; 382/128

(58) Field of Classification Search .......... 382/284, 382/128–133, 154, 254; 702/19–21; 250/201.3; 348/42–43; 356/12; 345/629–630
See application file for complete search history.

(56) References Cited

U.S. PATENT DOCUMENTS

| 6,101,265 | A | 8/2000 | Bacus et al. |
| 6,272,235 | B1 | 8/2001 | Bacus et al. |
| 6,313,452 | B1 * | 11/2001 | Paragano et al. ........... 250/201.3 |
| 7,035,478 | B2 * | 4/2006 | Crandall et al. ............... 382/284 |
| 7,778,485 | B2 * | 8/2010 | Zeineh et al. .................. 382/284 |
| 7,826,649 | B2 * | 11/2010 | Crandall et al. ............... 382/128 |
| 2005/0163390 | A1 * | 7/2005 | Chiang ......................... 382/254 |
| 2005/0234656 | A1 * | 10/2005 | Schwartz et al. ................ 702/20 |

FOREIGN PATENT DOCUMENTS

| JP | 09-281405 A | 10/1997 |
| JP | 2002-514319 A | 9/1998 |
| JP | 2002-514319 A | 5/2002 |

* cited by examiner

*Primary Examiner* — Sherali Ishrat
(74) *Attorney, Agent, or Firm* — Holtz, Holtz, Goodman & Chick PC

(57) ABSTRACT

In a virtual slide generation device for generating a virtual slide by patching/combining a plurality of observation images obtained by shooting and picking up an observation object observed by a microscope, by comprising an image patching/combination information calculation unit for calculating image patching/combination information about an area overlapping between observation images for the patching/combination on the basis of a plurality of observation images shot and picked up by a first observation method and an image patching/combination unit for patching and combining a plurality of image areas shot and picked up by a second observation method on the basis of the image patching/combination information calculated by the image patching/combination information calculation unit, image patching/combination computation by a plurality of microscopic examination methods can be reduced, thereby more particularly preventing the fading when shooting and picking up a fluorescence (FL) observation image and obtaining a high-quality image.

8 Claims, 22 Drawing Sheets

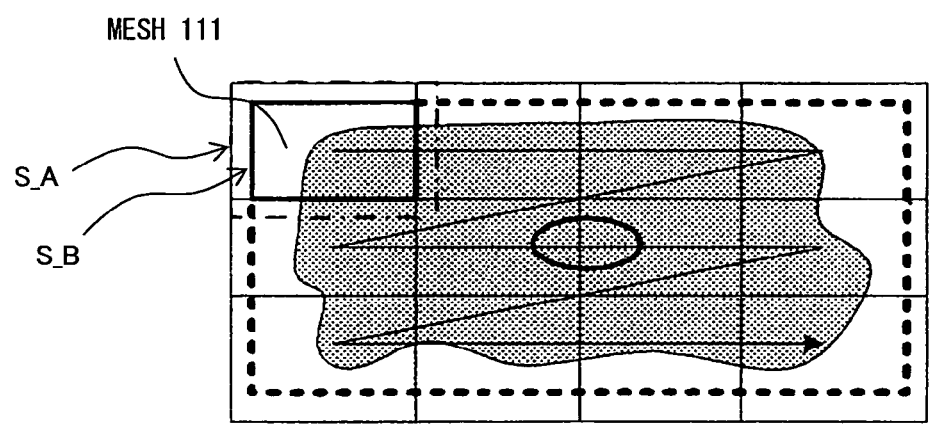
F I G. 5

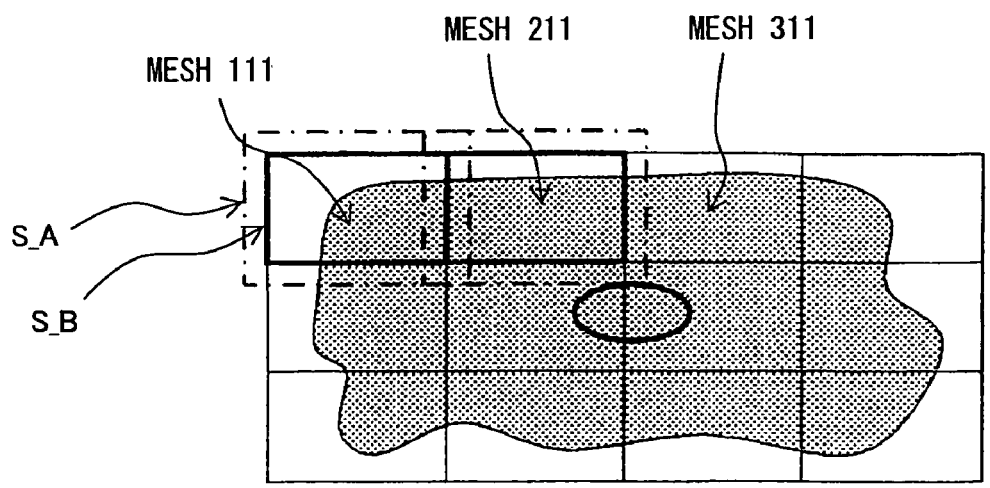
F I G. 6

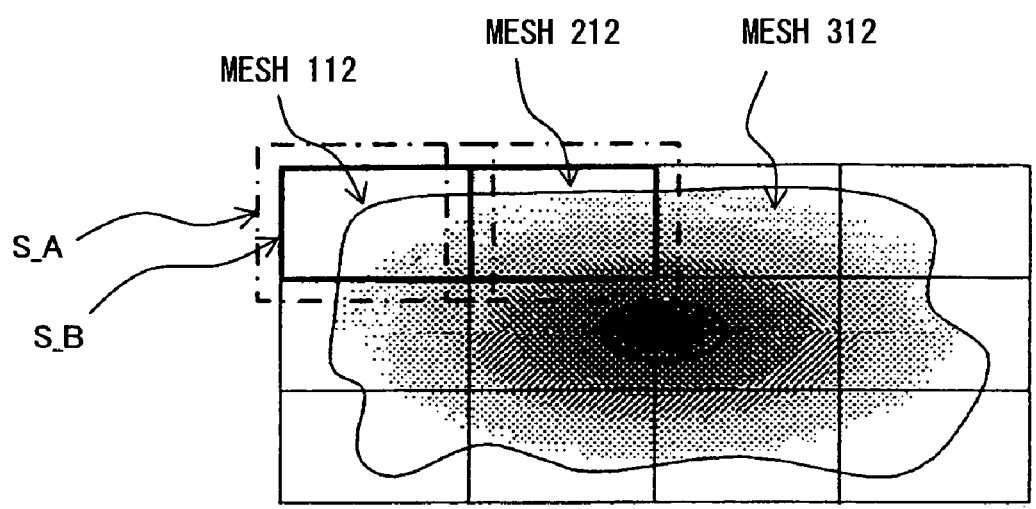
F I G. 7

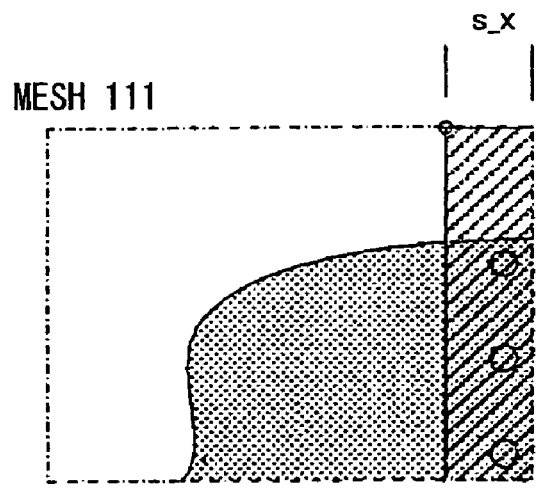
F I G. 8

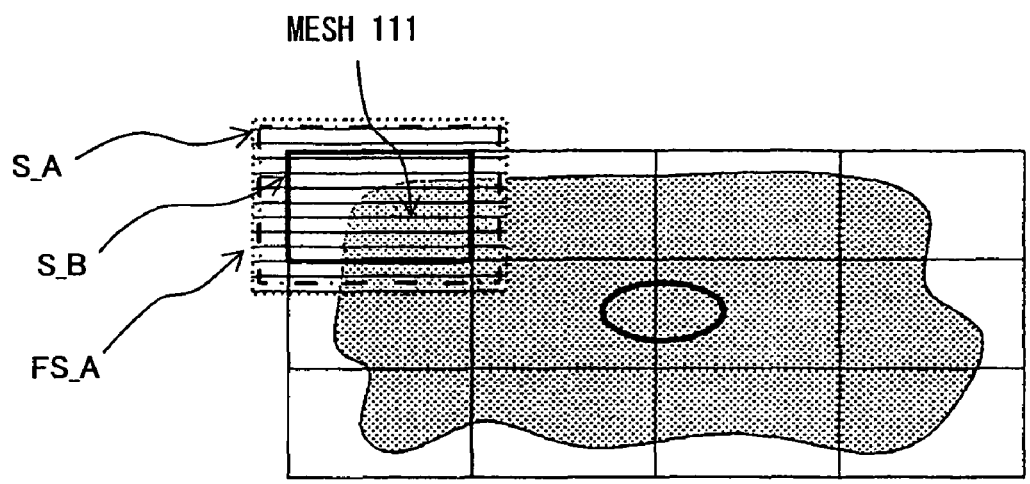
F I G. 2 1

VIRTUAL SLIDE GENERATION DEVICE, VIRTUAL SLIDE GENERATION METHOD, VIRTUAL SLIDE GENERATION PROGRAM PRODUCT AND VIRTUAL SLIDE GENERATION PROGRAM TRANSMISSION MEDIUM

CROSS REFERENCE TO RELATED APPLICATIONS

This application is based upon and claims the benefit of priority from the prior Japanese Patent Application No. 2007-26088, filed on Feb. 5, 2007, the whole contents of which are incorporated herein by reference.

BACKGROUND OF THE INVENTION

1. Field of the Invention

The present invention relates to a virtual slide generation device for generating a so-called virtual slide by patching and combining microscopic images shot and picked up with high magnification, its virtual slide generation method and its virtual slide generation program product, and more particularly to a virtual slide generation device capable of rapidly generating a high-quality virtual slide, its virtual slide generation method, a virtual slide generation program product and a virtual slide generation program transmission medium.

2. Description of the Related Art

Traditionally, when observing an observation object using a microscope, a range covered at one glance (observation range) is mainly determined by the magnification of an object lens. In this case, if an object lens with high magnification is used, its observation range is restricted to only a part of an observation object. However, the pathological examination of a cell, a texture and the like requires the whole image of an observation object in order to prevent the oversight of an examination point.

With the development of the information processing technique, the digitalization of images is promoted in such a pathological examination and as to a microscopic observation image which is shot and picked up via a video camera, high resolution almost equal to a traditional silver salt film is required.

In order to realize these requirements, for example, Japanese Patent Publication No. H9-281405 or 2002-514319 discloses a system for re-organizing the image of an observation object by dividing the mage of the observation object into small sections and shooting and picking up the part of the observation object, corresponding to each small section by an object lens with high resolution and patching and combining the microscopic images of each small obtained section. By using such a so-called virtual microscope system, an observation object can be observed by a microscope even in an environment where no observation object actually exists. By using the image processing technique, the following observation can be conducted in the same way as an act of actually observing an observation object.

Specifically, firstly, at the time of low-magnification observation a wide-angle image can be provided, for example, by compressing and displaying a patched and combined microscopic image. Whereas at the time of high-magnification observation high resolution can be provided by displaying a partial image shot and picked up for each small section. The display range of a microscopic image in display can be moved in accordance with an X-Y direction operation (moving operation in the horizontal direction on a plane perpendicular to the optic axis) by an observer.

In such a system an observation object can be examined any time. By sharing the image data of a microscopic image with a plurality of examiners, the plurality of examiners can simultaneously observe the different parts of the same observation object even when the plurality of examiners exists in different places.

When actually observing an observation object while applying the X-Y direction operation to it, focus deviation caused due to the inclination of the observation object and the like must be corrected. However, in the above-described system, since observation can be continued in the always focused state, observation efficiency can be improved, observation oversight due to focus deviation can be reduced, thereby increasing the reliability of an examination by that degree.

For example, when training pathological examiners, traditionally, a plurality of the same observation objects must be prepared in order to conduct practical observation training. However, according to the above-described system, since image data can be shared, training can be conducted using the same observation object image.

Furthermore, in the case of an actual observation object sealed into a piece of slide glass when it discolors or is broken, it is very difficult to restore it. However, since image data can be backed up, in the above-described system an observation object can be observed in the same state any time in any place.

As described above, the virtual microscope system is efficient and highly accurate compared with microscopic observation using an actual observation object, thereby having higher reliability.

SUMMARY OF THE INVENTION

One aspect of the present invention is a virtual slide generation device for generating a virtual slide by patching and combining a plurality of observation images obtained by shooting and picking up an observation object observed by a microscope. The virtual slide generation device comprises an image patching/combination information calculation unit for calculating image patching/combination information about an area overlapped between observation images by the patching/combination on the basis of the plurality of observation images shot and picked up by a first observation method and an image patching/combination unit for patching and combining a plurality of image areas shot and picked up by a second observation method on the basis of the image patching/combination information calculated by the image patching/combination information calculation unit.

BRIEF DESCRIPTION OF THE DRAWINGS

The present invention will be more apparent from the following detailed description when the accompanying drawings are referenced.

FIG. 5 shows the process of determining the mesh of a shooting/picking-up target and a shooting/picking-up route.

FIG. 6 shows a relationship between mesh positions in the differential inference contrast (DIC) observation image of an observation object 19.

FIG. 7 shows a relationship between mesh positions in the fluorescence (FL) observation image of an observation object 19.

FIG. 8 shows an image obtained by shooting and picking up a mesh 111 (DIC) shown in FIG. 6.

FIG. 21 shows the relationship between a mesh and an illumination range when shooting and picking up the mesh 111 (DIC).

DESCRIPTION OF THE PREFERRED EMBODIMENTS

The preferred embodiments of the present invention are described below with reference to the drawings.

The First Preferred Embodiment

Figure 1:
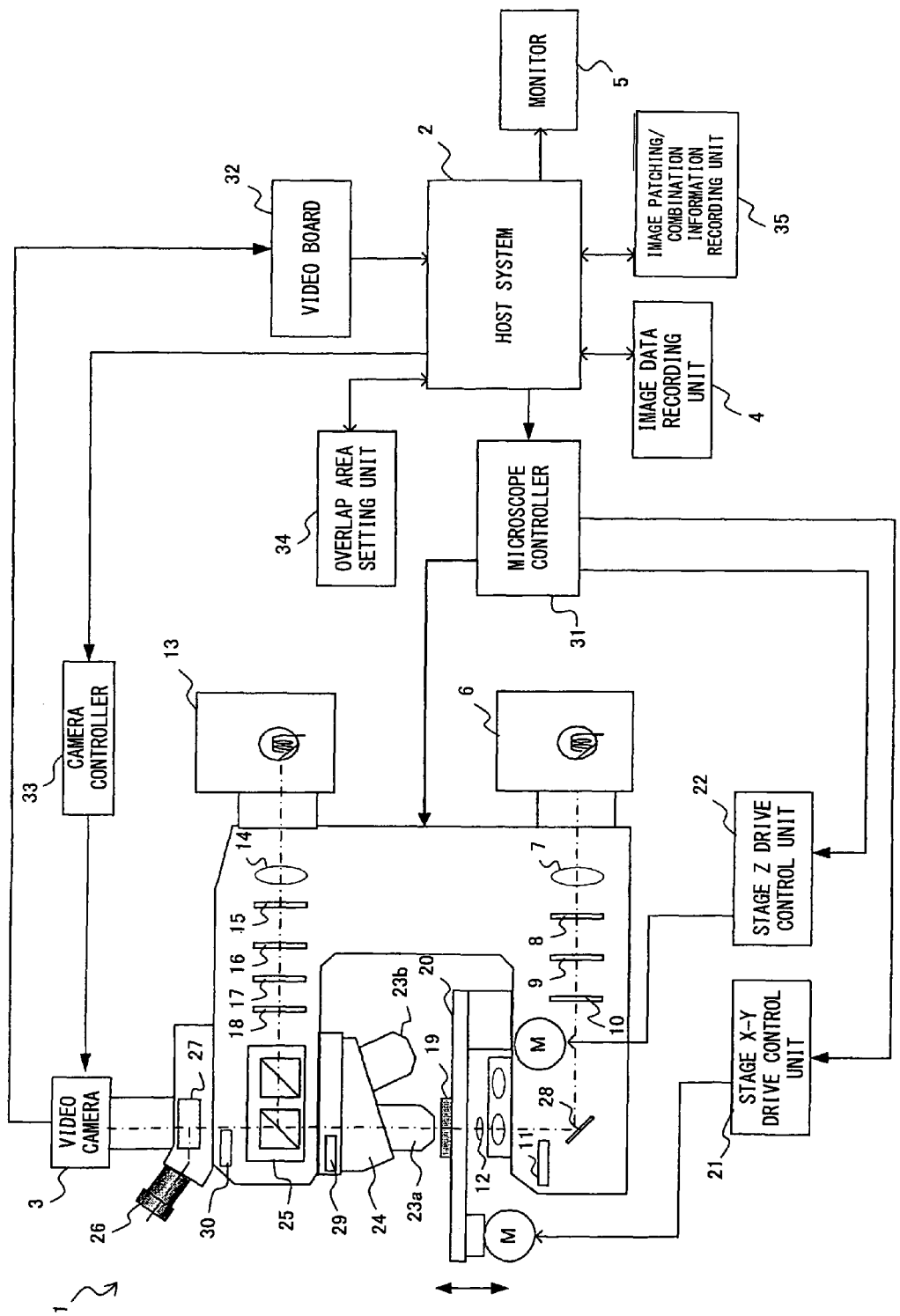
FIG. 1 shows a configuration example of the microscope system in the first preferred embodiment of the present invention.

FIG. 1 shows a configuration example of the microscope system in the first preferred embodiment of the present invention.

In FIG. 1, a microscope device 1 comprises a transparent illumination light source 6, a collector lens 7 for collecting the illumination light of the transparent illumination light source 6, a transparent filter unit 8, a transparent view aperture 9, a transparent opening aperture 10, a capacitor optical device unit 11 and a top lens unit 12 as a transparent observation optical system. The microscope device 1 also comprises an incident-light illumination light source 13, a collector lens 14, an incident-light filter unit 15, an incident-light shutter 16, an incident-light view aperture 17 and an incident-light opening aperture 18 as an incident-light observation optical system.

A motorized stage 20 movable in each of the vertical and horizontal directions is provided for an observation optical path in which the optical paths of these transparent and incident-light observation optical systems overlap and an observation object 19 is mounted on the motorized stage 20. The movement of this motorized stage 20 is controlled by a stage X-Y drive control unit 21 and a stage Z drive control unit 22. The motorized stage 20 has an origin detection function by an origin sensor, which is not shown in FIG. 1, and can set coordinates to each part of the observation object 19 mounted on the motorized stage 20.

A revolver 24 for selecting one to be used for observation from a plurality of mounted object lens 23a, 23b and so on (hereinafter generally called "object lens 23" as requested) by rotation, a cube unit 25 for switching between microscopic examination methods and a beam splitter 27 for splitting an observation optical path into an eye-piece lens 26 side and a video camera 3 side are also provided for the observation optical path.

Furthermore, a differential interference observation polarizer 28, DIC (differential interference contrast) prism 29 and an analyzer 30 can be inserted into the observation optical path.

Each of these units is motorized and its operation is controlled by a microscope controller 31, which is described later.

The microscope controller 31 connected to the host system 2 has a function to control the operation of the whole microscope device 1, specifically, a function to modify a microscopic examination method and adjust the transparent illumination light source 6 and the incident-light illumination light source 13, according to a control signal from the host system 2 and also to transmit the current microscopic examination state of the current microscope device 1 to the host system 2.

Since the microscope controller 31 is also connected to the stage X-Y drive control unit 21 and the stage Z drive control unit 22, the motorized stage 20 can be also controlled by the host system 2.

The microscopic image of the observation object 19 shot and picked up by a CCD being a camera device in the video camera 3 is taken into the host system 2 via a video board 32.

The host system 2 can perform the on/off of the automatic gain control, gain setting, on/off of automatic exposure control and setting of exposure time of the video camera 3 via a camera controller 33. The host system 2 can also store microscopic images transmitted from the video camera 3 in an image data recording unit 4 as an image data file. The image data recorded in the image data recording unit 4 can be read by the host system 2 and the microscopic image represented by the image data can be displayed on a monitor 5. Furthermore, the host system 2 provides a function to perform a focus operation on the basis of the contrast of an image shot and picked up by the video camera 3, a so-called video AF function and also has a function to record the coordinates of a focus position obtained by the video AF function on the image patching/combination information recording unit 35.

An overlap area setting unit 34 sets the overlap area of a plurality of pieces of sectional shooting/picking-up and the host system 2 connected to the microscope device 1 divides the observation object 19 into a plurality of sections and patches and combines images from small sectional overlap areas into a single image.

The host system 2 is a computer with a very standard configuration which comprises a central processing unit (CPU) for controlling the operation of the whole microscope system by executing a control program, main memory used as work memory as requested by this CPU, an input unit for obtaining various instructions from a user via a mouse, a keyboard or the like, an interface unit for managing the transmission/reception of various types of data between the components of this microscope system and an auxiliary storage device, such as a hard disk device and the like, for storing various types of programs and data.

Next, the operation of the microscope system in the first preferred embodiment with the above-described configuration is described.

In this first preferred embodiment, the case where the differential interference contrast (DIC) observation and the fluorescence (FL) observation are selected as the first and second microscopic examinations, respectively, and observation images by these two microscopic examinations are patched and combined is described.

Figure 2:
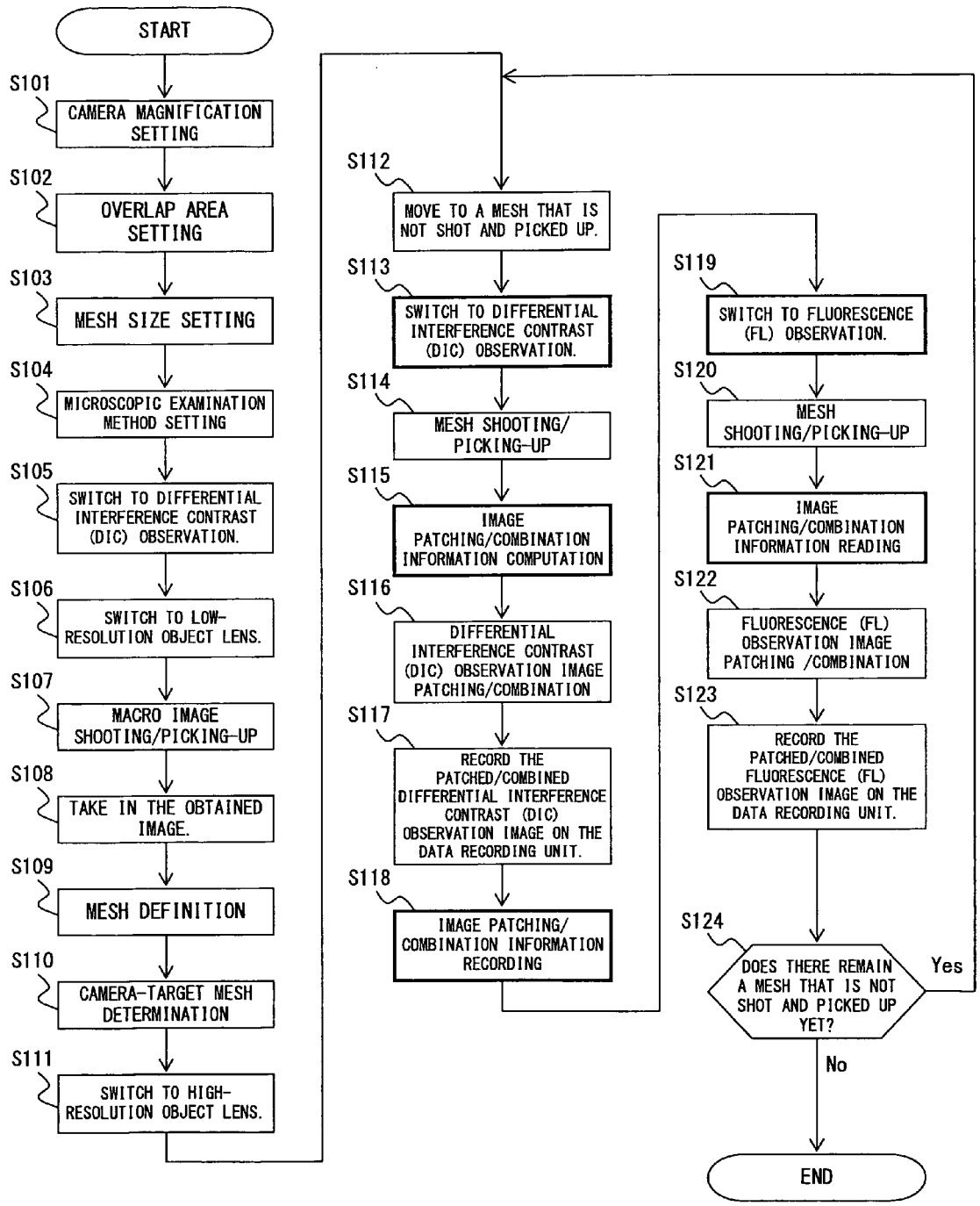
FIG. 2 is a flowchart showing the flow of a microscopic image data acquisition process performed by the host system 2 in the first preferred.

FIG. 2 is a flowchart showing the flow of a microscopic image data acquisition process performed by the host system 2 in the first preferred.

This macroscopic image data acquisition process obtains the macroscopic image data of the observation object 19 by the microscope system shown in FIG. 1, which is realized and started by the CPU of the host system 2 executing a prescribed control program.

First, in step S101, the magnification of the object lens 23 is set when shooting and picking up the whole image and when shooting and picking up images to be patched and combined. In this example, it is assumed that a 5x object lens 23a and a 20x object lens 23b are selected for shooting and picking up the whole image and images to be patched and combined, respectively, specifically, microscopic images shot and picked up by the 20x object lens.

Then, in step S102, overlap areas are prepared and shot/picked up in advance when patching and combining the images of the 20x object lens 23b and the setting of an overlap area being an area where coordinates for patching/combining images, calculated by image matching or the like is calculated on the basis of overlap areas between images to be patched and combined each other is set.

Figure 3:
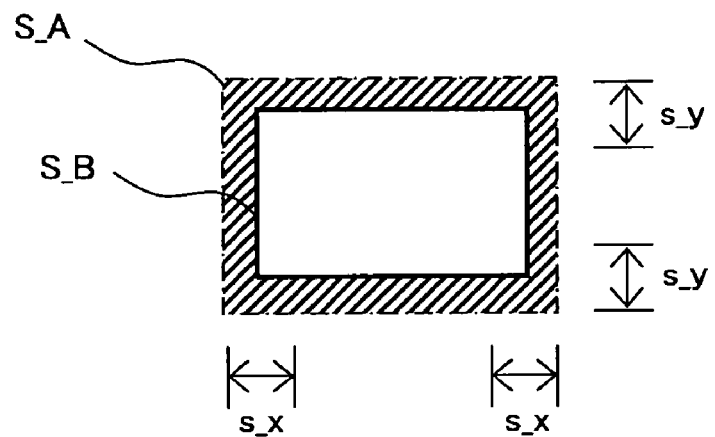
FIG. 3 shows a relationship between a shooting/picking-up area and an overlapped area.

FIG. 3 shows a relationship between a shooting/picking-up area and an overlap area.

FIG. 3 shows the shooting/picking-up range of the camera device (CCD) of the video camera 3 in the 20x object lens 23b, in which the range S_A includes overlap areas. In FIG. 3, a slashed area is an overlap area used when patching/combining images. Specifically, the size of S_B excluding an overlap area is the size of a small section (mesh) being the minimum unit of the divided area of a patched/combined image and in step S103 of FIG. 2, this mesh size is set. In the first preferred embodiment, it is assumed that each overlap area for patching/combination is specified by length s_x and s_y.

Description returns to FIG. 2.

Then, in step S104 instructions on the microscopic examination method of the observation object 19 is obtained from a user. In this example, it is assumed that the differential interference contrast (DIC) observation method and the fluorescence (FL) observation method are instructed as the first and second microscopic examination methods, respectively.

Then, in step S105 the process of modifying the setting of the microscope device 1 to the first microscopic examination set in step S104 is applied to the microscope controller 31. The microscope controller 31 controls each component of the microscope device 1 to be ready for the shooting and picking-up by the microscopic examination method according to this instruction. In this case, the microscope device 1 is made ready for the shooting and picking-up by the microscopic examination method by inserting the differential interference contrast observation polarizer 28, the DIC prism 29 and analyzer 30 into the observation optical path and so on.

Then, in step S106 by giving an instruction to the microscope controller 31 the revolver 24 is rotated to select the 5x object lens 23a.

Then, in step S107 by giving an instruction to the microscope controller 31, the whole image of the observation object 19 is shot and picked up by the video camera 3. In step S108, the low-resolution microscopic image obtained by the shooting/picking-up is taken in the host system 2 from the video camera 3 via the video board 32.

Then, in step S109 after starting this microscopic image data acquisition, a small section (mesh) obtained when shooting and picking up the observation object 19 using the 20x object lens 23b defined in step S103 is defined against the low-resolution microscopic image shot and picked up using the 5x object lens 23a.

Figure 4:
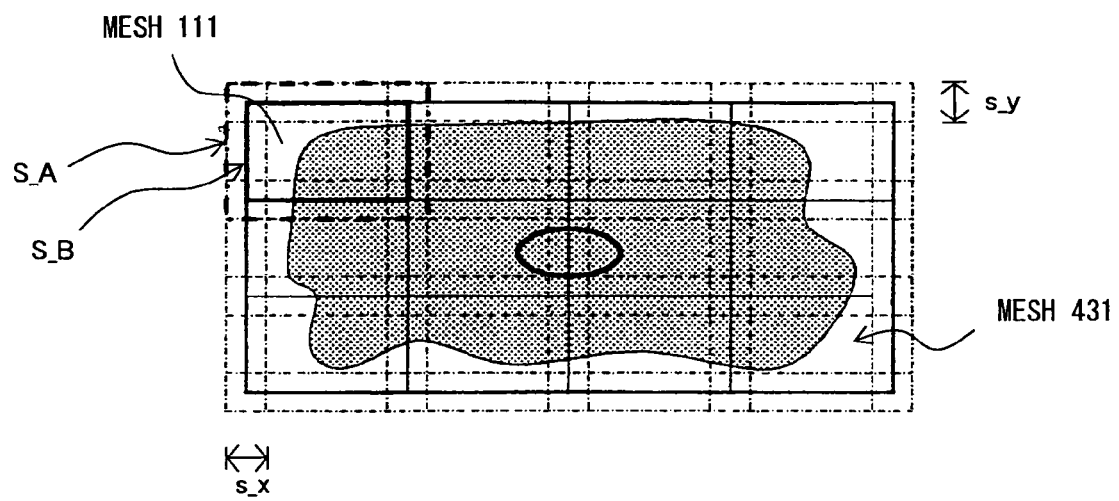
FIG. 4 shows the definition of a mesh.

FIG. 4 shows the definition of a mesh.

In the mesh definition in step S109 of FIG. 2, for example, as shown in FIG. 4, the mesh of a 3x4 (three-row four-column) rectangle is defined. Furthermore, in order to distinguish a differential interference contrast (DIC) observation image from a fluorescence (FL) observation image it is assumed that a mesh in the upper left and one in the lower right of FIG. 4 are meshes 111 and 431, respectively.

Description returns to FIG. 2 again.

In step S110 by checking whether each partial area of the low-resolution microscopic image divided by the defined mesh includes the partial image of the observation object 19, a target mesh to shoot and pick up using the 20x object lens 23b and its shooting/picking-up route are determined. This check can be performed, for example, on the basis of whether there is the outline image (contrast image) of the observation object 19 that can be obtained by calculating the difference with adjacent pixels, the color of an image in each mesh or the like. In the first preferred embodiment it is assumed that all the meshes are selected.

FIG. 5 shows the process of determining a target mesh to shoot/pick up and its shooting/picking-up route.

As shown in FIG. 5, in step S111 of FIG. 2, a target mesh to shoot and pick up using the 20x object lens 23b and its shooting/picking-up route (from a mesh in the left corner to the right, then from the left to the right of a subsequent line and from the left to the right of the last line) are determined.

Description returns to FIG. 2 again.

In step S111, by giving an instruction to the microscope controller 31, the revolver 24 is rotated to select the 20x object lens 23b.

Then, in step S112 by giving an instruction to the microscope controller 31 the motorized stage 20 is moved to under the 20x object lens 23b in the area of a meshed that is not shot/picked-up, of target high-resolution meshes determined in step S110. In this case, the motorized stage 20 is moved to the mesh 111 (DIC) shown in FIG. 5.

Then, in step S113, if observation is modified to fluorescence (FL) observation in step S119, which is described later, by giving an instruction to the microscope controller 31, the setting of the microscope device 1 is modified to differential interference contrast (DIC) observation.

Then, in step S114, the observation object 19 in the mesh 111 (DIC) position to which motorized stage 20 is moved in step S112 is shot and picked up using the video camera 3.

FIG. 6 shows a relationship between mesh positions in the differential inference contrast (DIC) observation image of the observation object 19. FIG. 7 shows a relationship between mesh positions in the fluorescence (FL) observation image of the observation object 19.

In FIGS. 6 and 7, the meshes 111 (DIC) and 112 (FL) and the meshes 211 (DIC) and 212 (FL) are located in the same coordinates, respectively.

Description returns to FIG. 2 again.

Since steps S115-S118 are for a patching/combination process, they are skipped if only one image is shot and picked up yet. This patching/combination process is described later.

Then, in step S119, by giving an instruction to the microscope controller 31, each component of the microscope device 1 is controlled to make the microscope device 1 ready for fluorescence (FL) observation.

Then, in step S120 the microscopic image of the observation object 19 in the mesh 112 (FL) position shown in FIG. 7 is shot and picked up.

Since steps S121-S123 are for a patching/combination process, they are skipped if only one image is shot and picked up yet. This patching/combination process is described later.

Then, in step S124 it is determined whether there remains a mesh that is not shot and picked up yet. If there is one (Yes in step S124), the mesh shooting/picking-up and patching/combination processes in step S112 and after are repeatedly applied to a subsequent mesh until the shooting/picking-up and patching/combination processes of all the set meshes are completed. Specifically, the meshes 111 (DIC), 112 (FL), 211 (DIC), 212 (FL), 311 (DIC), 312 (FL) and so on are shot and picked up in that order.

Then, the patching/combination process skipped above is described using the meshes 111 (DIC) and 211 (DIC) shown in FIG. 6 and the meshes 112 (FL) and 212 (FL) shown in FIG. 7.

FIG. 8 shows an image obtained by shooting and picking up the mesh 111 (DIC) shown in FIG. 6.

Figure 9:
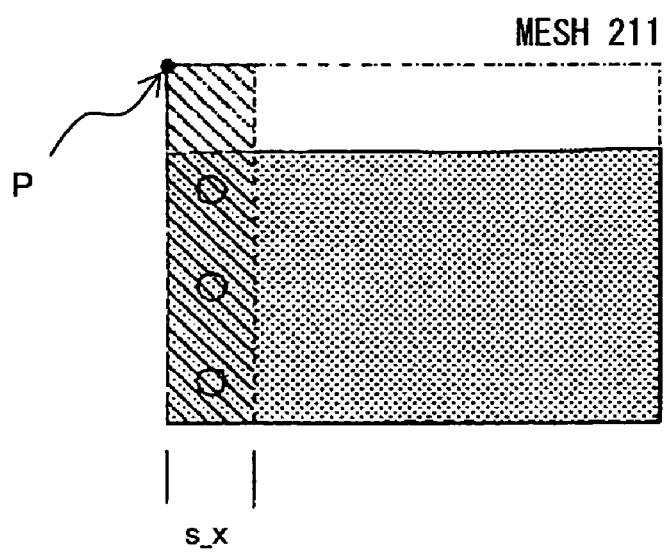
FIG. 9 shows an image obtained by shooting and picking up a mesh 211 (DIC) shown in FIG. 6.
Figure 10:
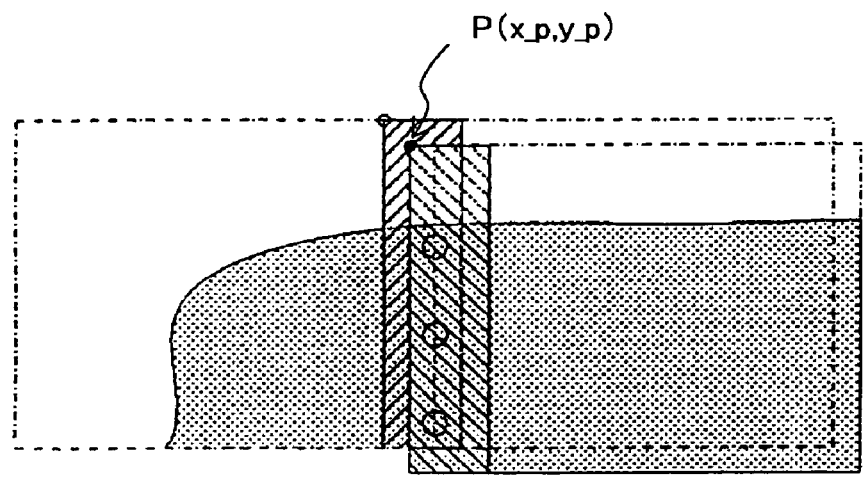
FIG. 10 shows an image obtained by shooting and picking up an image-matched mesh 111 (DIC) and an image obtained by shooting and picking up the mesh 211 (DIC).
Figure 11:
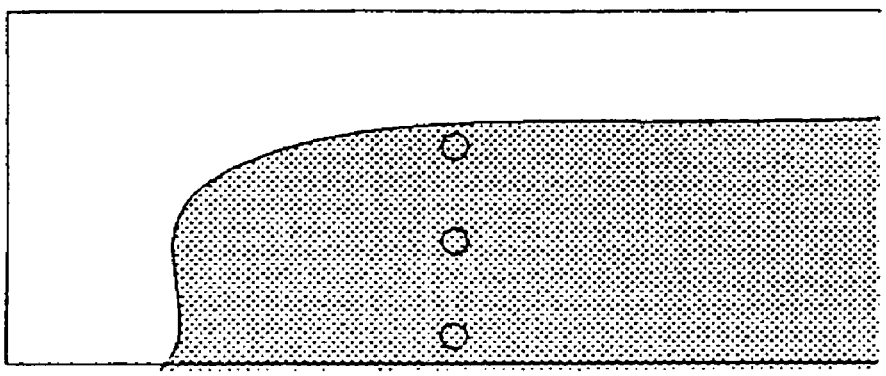
FIG. 11 shows an image obtained by shooting and picking up a patched/combined mesh 111 (DIC) and an image obtained by shooting and picking up the mesh 211 (DIC).
Figure 12:
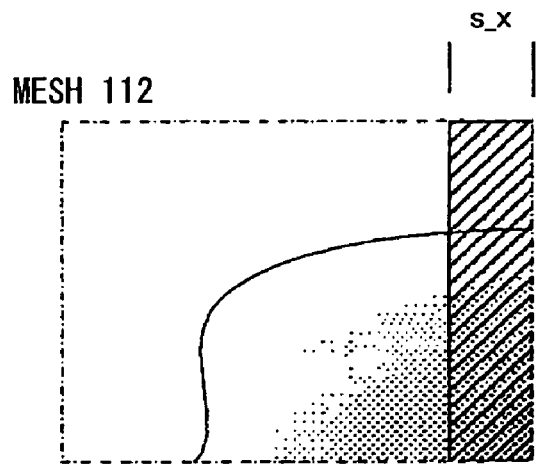
FIG. 12 shows an image obtained by shooting and picking up a mesh 112 (FL) shown in FIG. 7.
Figure 13:
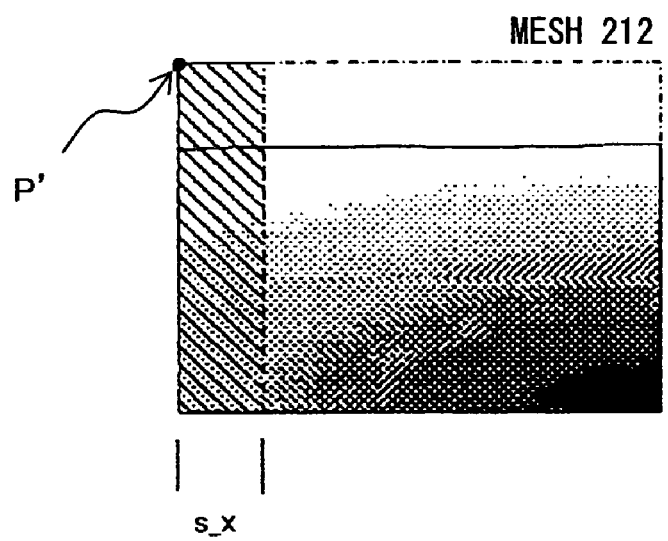
FIG. 13 shows an image obtained by shooting and picking up a mesh 212 (FL) shown in FIG. 7.
Figure 14:
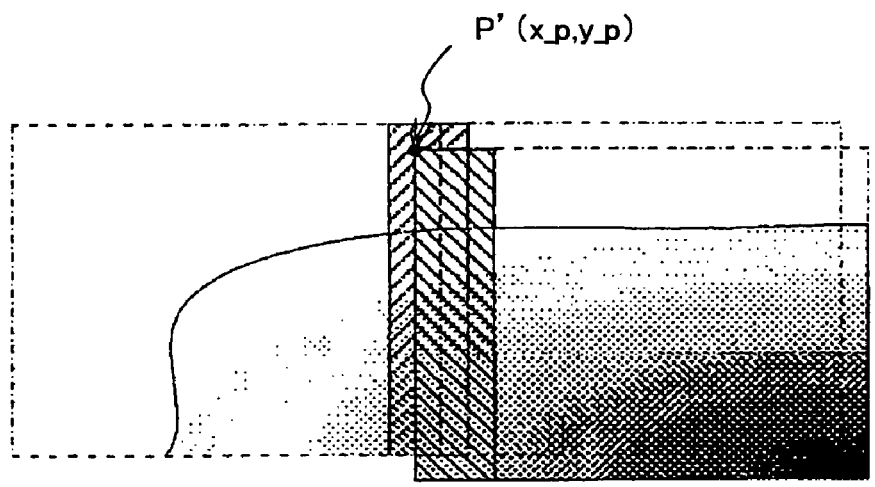
FIG. 14 shows an image obtained by shooting and picking up an image-matched mesh 112 (FL) and an image obtained by shooting and picking up the mesh 212 (FL).
Figure 15:
FIG. 15 shows an image obtained by shooting and picking up a patched/combined mesh 112 (FL) and an image obtained by shooting and picking up the mesh 212 (FL).

FIG. 9 shows an image obtained by shooting and picking up the mesh 211 (DIC) shown in FIG. 6. FIG. 10 shows an image obtained by shooting and picking up an image-matched mesh 111 (DIC) and an image obtained by shooting and picking up the mesh 211 (DIC). FIG. 11 shows an image obtained by shooting and picking up the patched/combined mesh 111 (DIC) and an image obtained by shooting and picking up the mesh 211 (DIC). FIG. 12 shows an image obtained by shooting and picking up the mesh 112 (FL) shown in FIG. 7. FIG. 13 shows an image obtained by shooting and picking up the mesh 212 (FL) shown in FIG. 7. FIG. 14 shows an image obtained by shooting and picking up an image-matched mesh 112 (FL) and an image obtained by shooting and picking up the mesh 212 (FL). FIG. 15 shows an image obtained by shooting and picking up a patched/combined mesh 112 (FL) and an image obtained by shooting and picking up the mesh 212 (FL).

Even when patching/combination is applied to an already shot/picked-up mesh 111 (DIC) after the mesh 211 (DIC) is shot and picked up in step S114 of FIG. 2, blur occurs in the patched/combined image due to the play of the motorized stage 20 or the like. Therefore, in step S115 image patching/combination information being information for patching the mesh 111 (DIC) on the mesh 211 (DIC) and combining them is computed. Specifically, the coordinates of the position P in the mesh 211 (DIC) is computed. The host system 2 performs this coordinate calculation in the overlap area indicated by slash in FIGS. 8 and 9 using a so-called image matching method. By this coordinate calculation, as shown in FIG. 10, the image patching/combination coordinates (x_p, y_p) in the position P of the mesh 211 (DIC) can be calculated.

Then, in step S116 similarly the host system 2 patches the mesh 211 (DIC) on the mesh 111 (DIC) and combining them on the basis of the image patching/combination coordinates (x_p, y_p) calculated in step S115, as shown in FIG. 11.

Furthermore, in step S117 the patched/combined differential interference contrast (DIC) observation n image is recorded on the image data recording unit 4. Then, in step S118 the image patching/combination coordinates (x_p, y_p) is recorded on the image patching/combination information recording unit 35.

Next, the process of patching the fluorescence (FL) observation image mesh 212 (FL) on the fluorescence (FL) observation image mesh 112 (FL) and combining them is described.

After the image patching/combination coordinates (x_p, t_p) is recorded on the image patching/combination information recording unit 35 in step S118, in step S119 observation is switched to fluorescence (FL) observation and in step 120 the mesh 212 (FL) is shot and picked up. Then, after the mesh 212 (FL) is shot and picked up, the mesh 212 (FL) is patched on the mesh 112 (FL) and is combined with it. Specifically, for the coordinates P' of the mesh 212 (FL) against the mesh 112 (FL), the image patching/combination coordinates (x_P, y_p) obtained by patching the mesh 111 (DIC) calculated in step S115 and the mesh 211 (DIC) as shown in FIG. 14 is used against the image obtained by shooting and picking up the mesh 112 (FL) as shown in FIG. 12 and the image obtained by shooting and picking up the mesh 212 (FL) as shown in FIG. 13.

More particularly, in step S121 the image patching/combination coordinates (x_p, y_p) calculated in step S115 is read from the image patching/combination information recording unit 35 and in step S122 the host system 2 patches it on the mesh 112 (FL) and combines it with the mesh 112 (FL) as shown in FIG. 15. Then, after the completion of the patching/combination process in step S122, in step S123 the fluorescence (FL) observation patching/combination image is recorded on the image data recording unit 4.

Then, in step S124 it is determined whether there remains a mesh that is not shot and picked up yet. If there remains it (Yes in step S124), the shooting/picking-up and patching/combination processes of meshes that are not shot and picked up yet in step S112 and after are repeated until the shooting/picking-up and patching/combination processes of all the set meshes are completed. Specifically, in steps S119-S123 the patching/combination process of fluorescent observation images (FL)(step S121) is repeated using the differential interference contrast (DIC) observation image patching/combination information obtained in step S115.

As described above, in the microscope system of this first preferred embodiment for re-organizing the image of the observation object 19 by patching/combining a microscope image obtained by shooting/picking up the observation object 19, that is, in a so-called virtual microscope system, by providing the image patching/combination information recording unit 35 when generating a patching/combination image using the microscopic examination methods of the differential interference contrast (DIC) and fluorescence (FL) observations, the computation process can be shared and its process running speed can be improved.

Furthermore, even when there are many noise factors in an image in a patched/combined part in the patching/combination process of a fluorescent (FL) observation image and the accuracy of the image patching/combination deteriorates, by using the computation result of the other differential interference contrast (DIC) observation microscopic examination, the accuracy can be improved, thereby providing high-quality fluorescence (FL) observation patching/combination image.

Although in this first preferred embodiment the patching/combination of an fluorescence (FL) observation image on the basis of image patching/combination information obtained by differential interference contrast (DIC) observation has been described, shooting/picking-up in a different microscopic examination on the basis of camera information in some microscopic examination method is not limited to the exemplified microscopic examination method, which can be also replaced with another microscopic examination.

Although two microscopic examination methods have been used, a plurality of microscopic examination methods can be also used.

Furthermore, the differential interference contrast (DIC) observation image is not patched and combined and can be also used only for the patching/combination computation of a fluorescence (FL) observation image.

If in the differential interference contrast (DIC) observation being the first observation method image patching/combination information cannot be computed due to the lack of image information or the like, patching/combination by specified (default) coordinates can be also performed.

The Second Preferred Embodiment

Then, the second patching/combination of the present invention is described.

Figure 16:
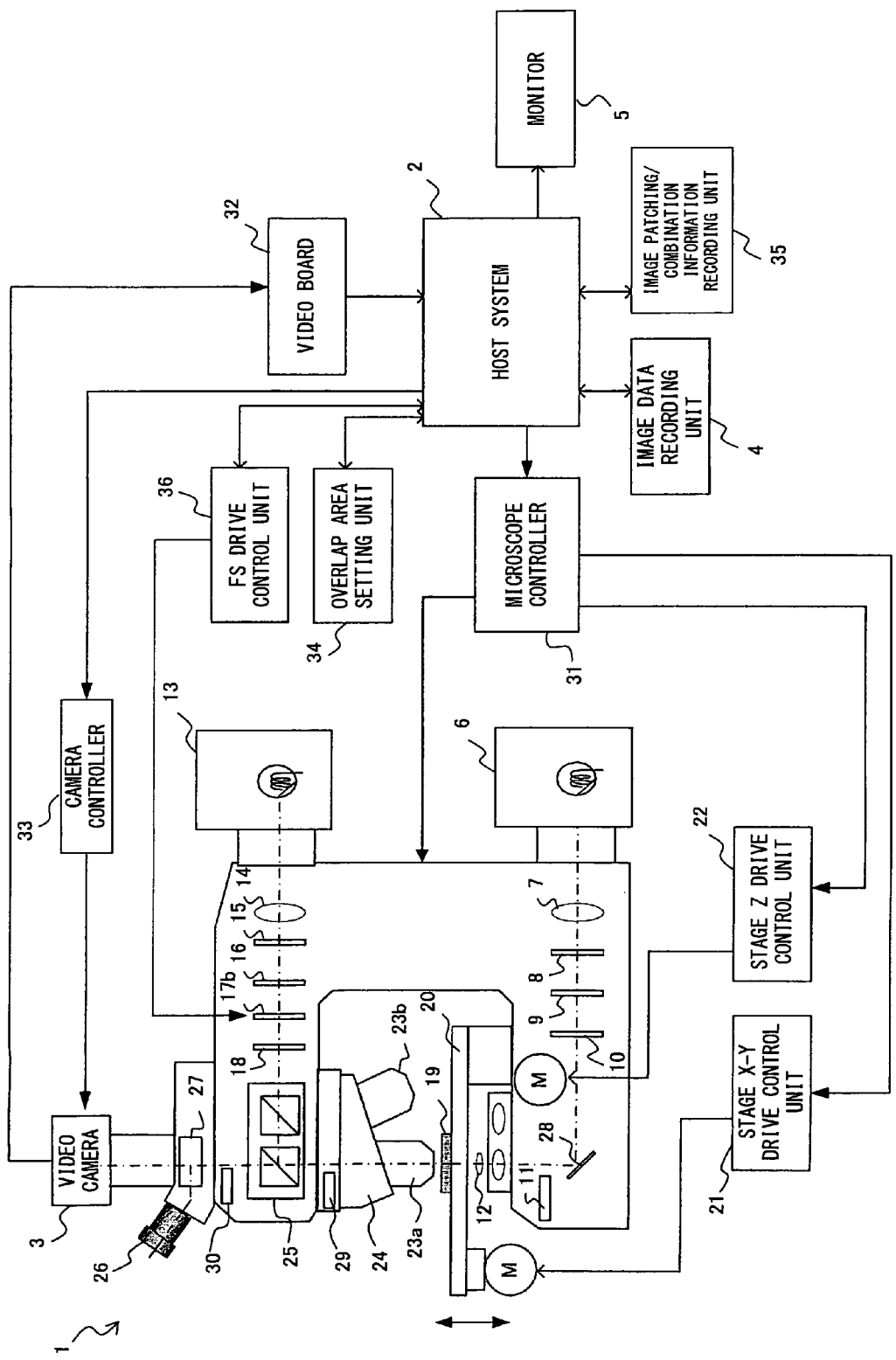
FIG. 16 shows a configuration example of the microscope system in the second preferred embodiment of the present invention.

FIG. 16 shows a configuration example of the microscope system in the second preferred embodiment of the present invention.

This second preferred embodiment can be obtained by providing a motorized incident-light view aperture 17b instead of the incident-light view aperture 17 in the above-described first preferred embodiment and further providing an FS drive control unit 36. Since the other components are the same as those of the first preferred embodiment, the same numerical references are used as in the first preferred embodiment and their descriptions are omitted.

The motorized incident-light view aperture 17b is a motorized rectangular opening view aperture, the vertical and horizontal sizes of whose opening are variable. For example, since it is composed of two apertures (H_A and H_B shown in FIGS. 19 and 20, which are described later) and can be driven in the X-Y direction, the vertical and horizontal sizes of the opening are variable.

Then, the FS drive control unit 34 controls the vertical and horizontal sizes of the opening of the motorized incident-light view aperture 17b. More particularly, by receiving an instruction from the host system 2 and the FS drive control unit 34 connected to the microscope controller 31 driving each of the two apertures (H_A and H_B shown in FIGS. 19 and 20, which are described later) in the X-Y direction, the sizes of the opening can be controlled variously to change the illumination range when shooting and picking up the observation object 19.

Next, the operation of the microscope system in the second preferred embodiment with the above-described configuration is described.

In this second preferred embodiment, as in the first preferred embodiment, the case where differential interference contrast (DIC) observation and fluorescence (FL) observation are selected as the first and second microscopic examination methods, respectively, and observation images by these two microscopic examination methods are patched and combined is described.

Figure 17:
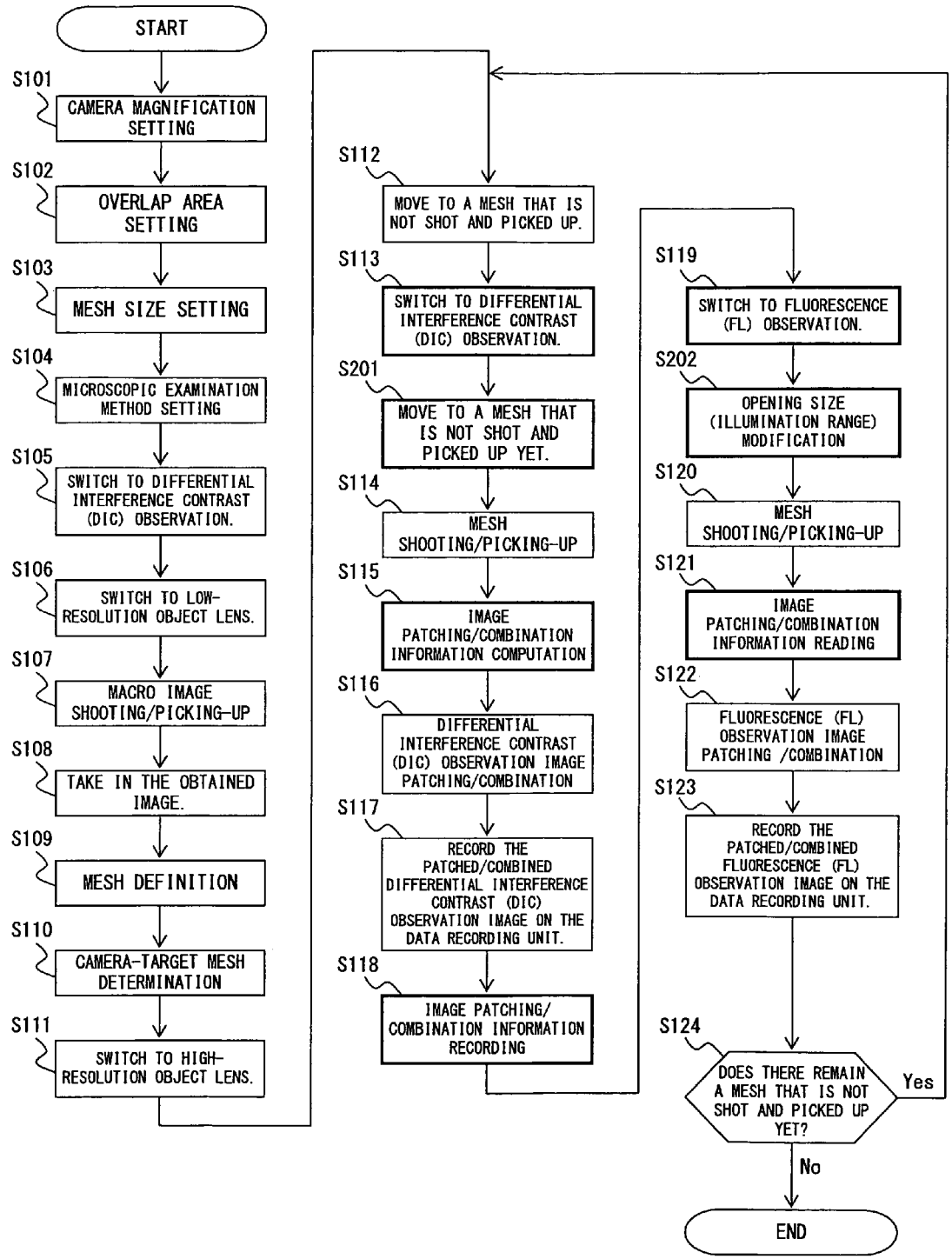
FIG. 17 is a flowchart showing the flow of a microscopic image data acquisition process performed by the host system 2 in the second preferred.

FIG. 17 is a flowchart showing the flow of a microscopic image data acquisition process performed by the host system 2 in the second preferred embodiment.

In FIG. 17, the loop of step S101 for the "setting of camera magnification" through step S111 for "switching to a high-resolution object lens", steps S112, 113, 114 through S119 and S120 through S124 is the same as that of the first preferred embodiment. In this second preferred embodiment, step S201 for the process of "the modification of opening size (illumination range)" in the differential interference contrast (DIC) observation and step S202 for the process of "the modification of opening size (illumination range)" in the fluorescence (FL) observation are added after steps S113 and S119, respectively.

Figure 18:
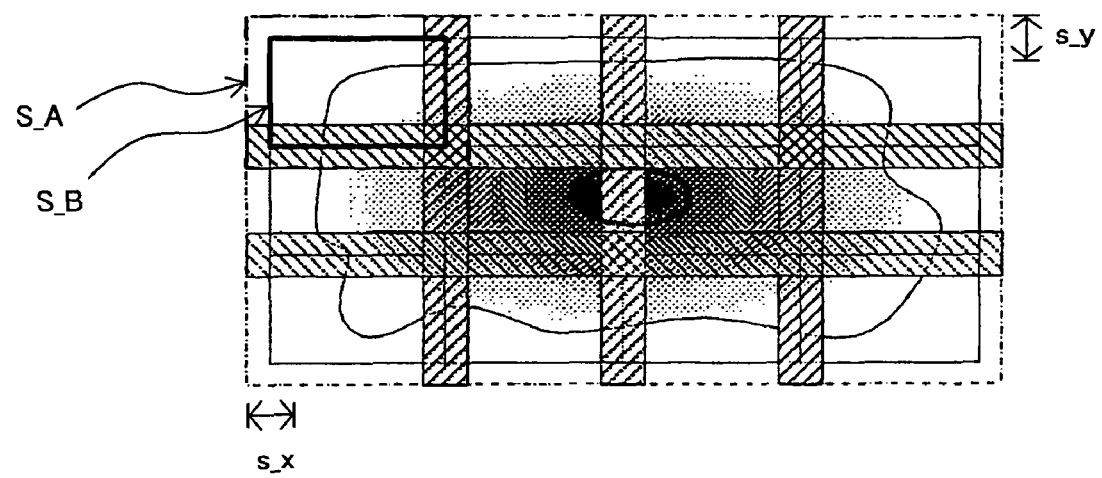
FIG. 18 shows the illumination range at the time of mesh image shooting/picking-up.
Figure 19:
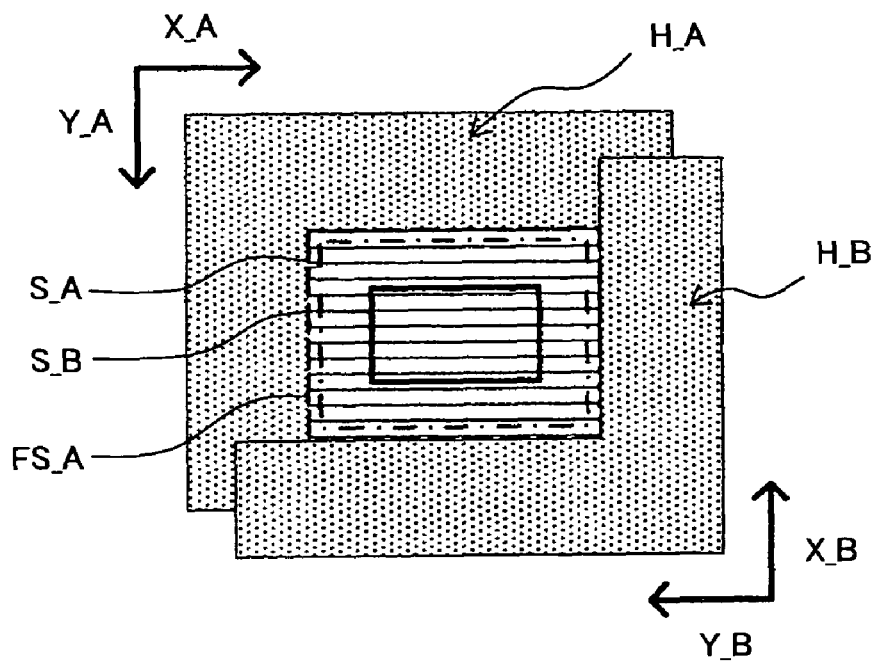
FIG. 19 shows the illumination range at the time of differential interference contrast (DIC) observation.
Figure 20:
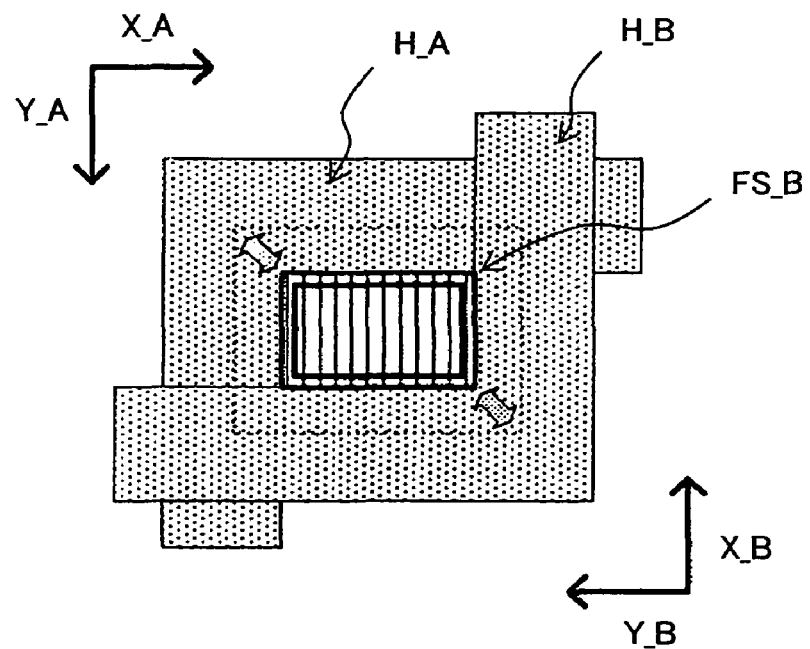
FIG. 20 shows the illumination range at the time of fluorescence (FL) observation.

FIG. 18 shows the illumination range at the time of mesh image shooting/picking-up. FIG. 19 shows the illumination range at the time of differential interference contrast (DIC) observation. FIG. 20 shows the illumination range at the time of fluorescence (FL) observation.

As shown in FIG. 18, the illumination range at the time of shooting/picking up a mesh image in step S114 or S120 of FIG. 17 can be the range S_A specified by the mesh shown in FIG. 18. However, since an image patching/combination overlap area slashed in FIG. 18 is provided, this slashed overlap area is doubly illuminated when taking in a fluorescence (FL) observation image in step S120 of FIG. 17, thereby leading to the fading of the observation object 19.

Therefore, when taking in a differential interference contrast (DIC) observation mesh image in step S201 of FIG. 17, the FS drive control unit 36 controls in such a way that the opening size of the motorized incident-light view aperture 17b may become the illumination range FS_A which covers the taking—in range S_A shown in FIG. 17.

Then, when taking in a fluorescence (FL) observation mesh image in step S202 of FIG. 17, as shown in FIG. 20, the FS drive control unit 36 controls in such a way that the opening size of the motorized incident-light view aperture 17b may become the illumination range FS_B which covers the taking—in range S_B excluding the overlap area.

Figure 22:
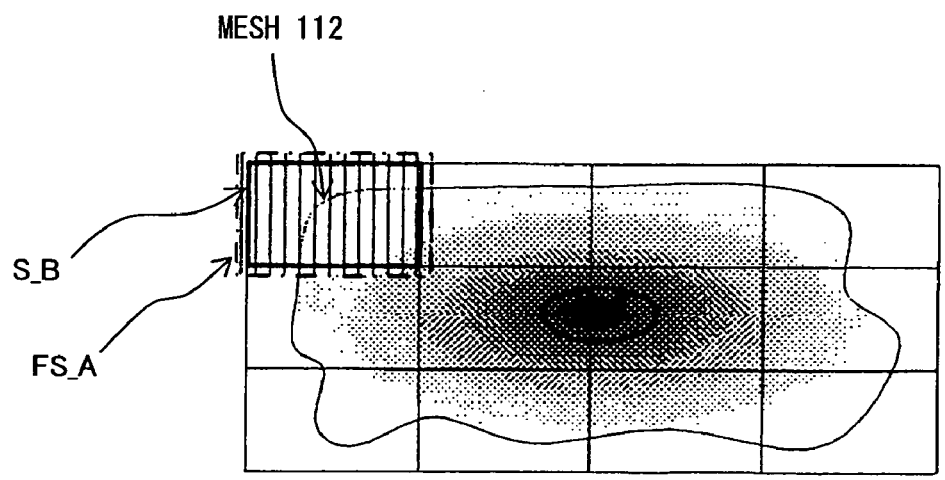
FIG. 22 shows the relationship between a mesh and an illumination range when shooting and picking up the mesh 112 (FL).

FIG. 21 shows the relationship between a mesh and an illumination range when shooting and picking up the mesh 111 (DIC). FIG. 22 shows the relationship between a mesh and an illumination range when shooting and picking up the mesh 112 (FL).

By controlling the opening size of the motorized incident-light view aperture 17b thus, the relationship between a mesh and an illumination range when shooting and picking up the mesh 111 (DIC) as shown in FIG. 21 can be that between a mesh and an illumination range when shooting the mesh 112 (FL) shown in FIG. 22, thereby preventing illumination light from being applied to the overlap area more than required.

As in the first preferred embodiment, an image patching/combination process reads differential interference contrast (DIC) image patching/combination information from the image patching/combination information recording unit 35 and performs a fluorescence (FL) image patching/combination process on the basis of this data.

As described above, the microscope system in this second preferred embodiment is a so-called virtual microscope system for re-organizing the image of the observation object 19 by patching and combining a microscopic image obtained by shooting and picking up the observation object 19. The microscope system comprises a motorized rectangular-opening incident-light view aperture 17b whose vertical and horizontal sizes are variable and an FS drive control unit 36 for controlling the vertical and horizontal sizes of the view aperture opening. The microscope system can change the illumination range against the observation object 19 in such a way that illumination may not be applied to an overlap area by changing the opening sizes in the fluorescence (FL) observation image patching/combination process, thereby preventing the fading of the observation object (specimen) 19.

Although in this second preferred embodiment, the unit for changing the illumination range was a motorized rectangular-opening FS, it is not limited to this as long as extra illumination light is not applied to the overlap area of the observation object 19 and can be also another illumination-range variable unit, such as DMD or the like.

Although the first and second preferred embodiments of the present invention have been described so far, a control program for enabling the CPU of the above-described computer with a standard configuration can be prepared in advance, it can be also recorded on a computer-readable storage medium and the computer can also read the program from the storage medium and perform the process shown in the flowchart of FIG. 2 or 17 by executing the program.

For the storage medium whose recorded control program a computer can read, a storage device, such as ROM built in the computer or provided outside as an auxiliary device, a hard disk, etc. and portable storage medium, such as a flexible disk, MO (magneto-optical disk), CD-ROM, DVD-ROM, etc., whose recorded control program can be read by inserting it a medium drive device provided for a computer and the like can be used.

The storage medium can be also a storage device provided for a computer system functioning as a program server, connected to a computer via a communication line. In this case, by transmitting a transmission signal obtained by modulating a carrier wave by a data signal expressing a control program and the CPU can execute this control program by the computer demodulating the received transmission signal to regenerate the control program.

Although the preferred embodiments have been described so far, the present invention is not limited to the above-described preferred embodiments and can be variously improved and modified as long as the subject matter of the present invention is not deviated. For example, although in the microscope system of each of the above-described preferred embodiments, an erect microscope device is adopted as the microscope device 1, an inverted microscope device can be also used instead of it. Alternatively, this preferred embodiment can be applied to various systems, such as a line device in which a microscope device is built.

What is claimed is:

1. A virtual slide generation device for generating a virtual slide by patching/combining a plurality of observation images obtained by shooting and picking up an observation object observed by a microscope, comprising:
    an image patching/combination information calculation unit for calculating image patching/combination information about an area overlapping between observation images for the patching/combination on the basis of a plurality of observation images shot and picked up by a first observation method; and
    an image patching/combination unit for patching and combining a plurality of image areas shot and picked up by a second observation method on the basis of the image patching/combination information calculated by the image patching/combination information calculation unit.

2. The virtual slide generation device according to claim 1, further comprising:
    a camera control unit for controlling a camera device for shooting and picking up the observation object; and
    a stage control unit for controlling a stage for moving the observation object,
    wherein
    the camera control unit controls the camera device in such a way as to continuously shooting and picking up each of the plurality of observation images by the first and second observation methods, and
    the stage control unit controls to move the stage for a subsequent continuous shooting/picking-up after continuous shooting/picking-up of the camera control unit.

3. The virtual slide generation device according to claim 1, further comprising
    an illumination control unit for controlling illumination light,
    wherein
    the illumination control unit controls to differentiate an illumination range of the illumination light by the first and second observation methods.

4. The virtual slide generation device according to claim 3, wherein
    the illumination control unit controls to exclude the overlap area from the illumination range in the case of the second observation method.

5. The virtual slide generation device according to claim 1, wherein
    the second observation method is fluorescence (FL) observation.

6. A virtual slide generation method for generating a virtual slide by patching/combining a plurality of observation images obtained by shooting and picking up an observation object observed by a microscope, comprising:
    calculating image patching/combination information about an area overlapping between observation images for the patching/combination on the basis of a plurality of observation images shot and picked up by a first observation method; and
    patching and combining a plurality of image areas shot and picked up by a second observation method on the basis of the calculated image patching/combination information.

7. A virtual slide generation device for generating a virtual slide by patching/combining a plurality of observation images obtained by shooting and picking up an observation object observed by a microscope, comprising:
    image patching/combination information calculation means for calculating image patching/combination information about an area overlapping between observation images for the patching/combination on the basis of a plurality of observation images shot and picked up by a first observation method; and
    image patching/combination means for patching and combining a plurality of image areas shot and picked up by a second observation method on the basis of the image patching/combination information calculated by the image patching/combination information calculation means.

8. A medium, non-transitory computer readable medium storing a program for enabling a computer of a virtual slide generation device to generate a virtual slide by patching and combining a plurality of observation images obtained by shooting and picking up an observation object observed by a microscope to execute a process, the process comprising:
    calculating image patching/combination information about an area overlapping between observation images for the patching/combination on the basis of a plurality of observation images shot and picked up by a first observation method (image patching/combination information calculation step); and
    patching and combining a plurality of image areas shot and picked up by a second observation method on the basis of the image patching/combination information calculated by the image patching/combination information calculation step (image patching/combination step).

* * * * *